Patented Sept. 25, 1951

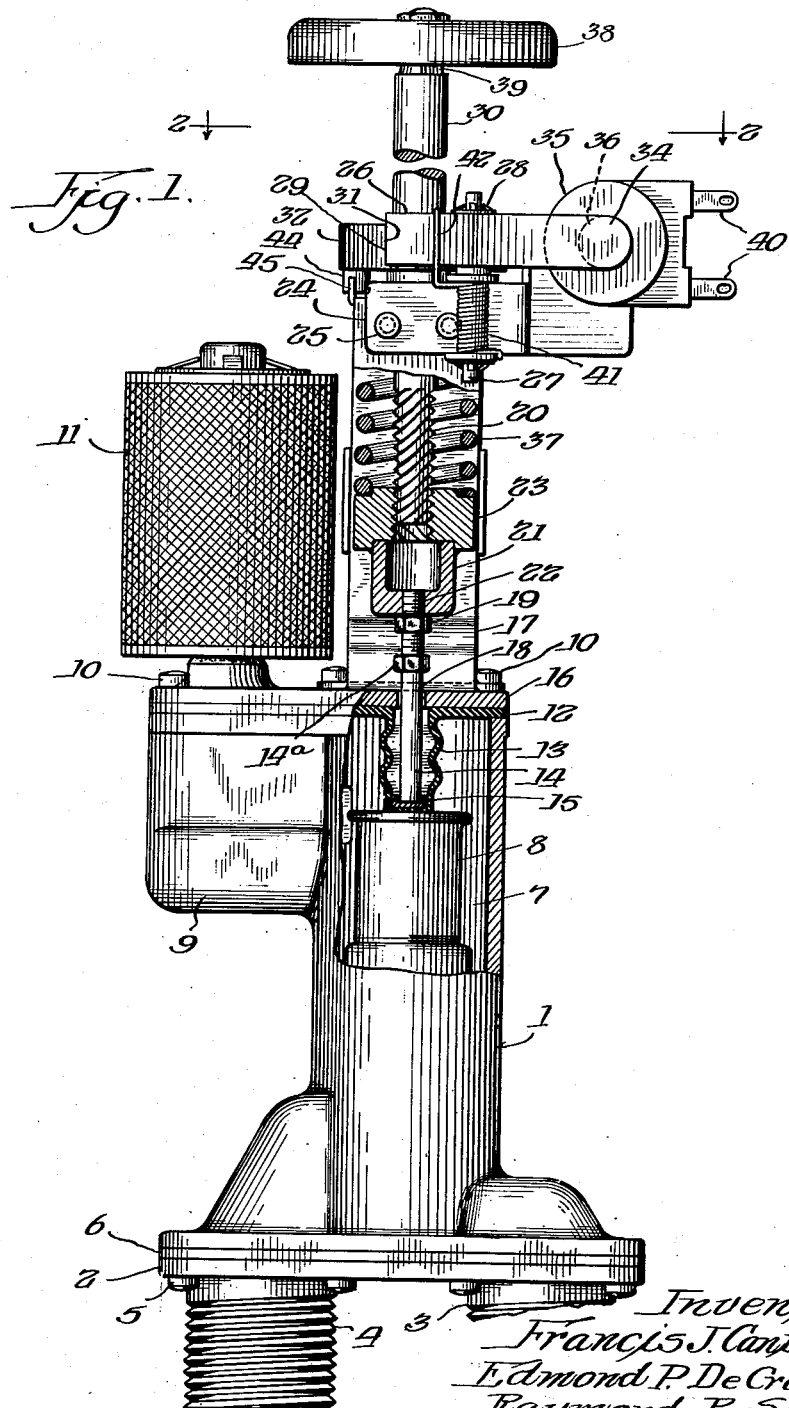

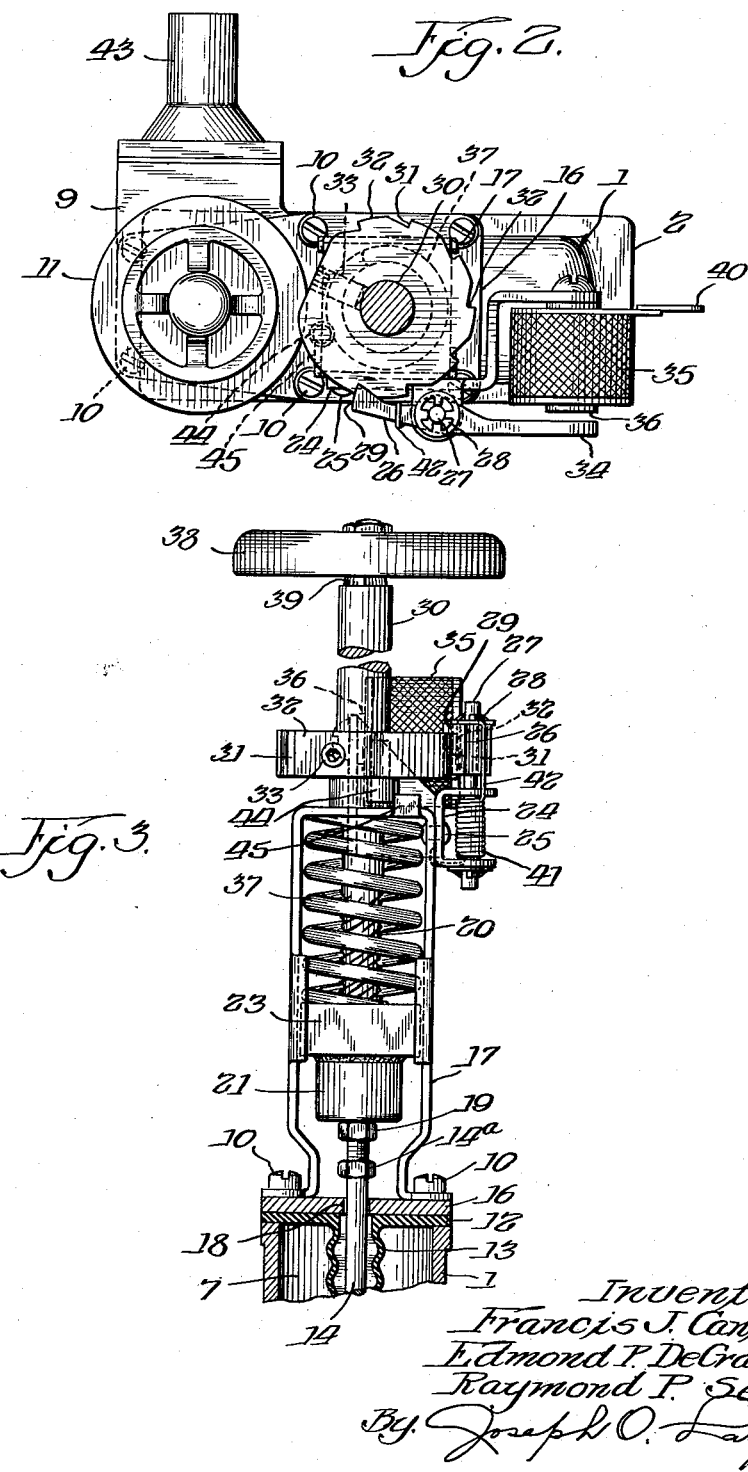

2,569,402

UNITED STATES PATENT OFFICE 2,569,402

TEMPERATURE CONTROL MECHANISM

Francis J. Cantalupo, Chicago, Edmond P. De Craene, Westchester, and Raymond P. Setka, Chicago, Ill., assignors to Crane Co., Chicago, Ill., a corporation of Illinois Application February 9, 1948, Serial No. 7,208

7 Claims. (Cl. 297—3)

This invention relates to a temperature control mechanism. More particularly, it is concerned with a novel temperature control mechanism for use with a valve for example suitable for installation on an automatic washing machine or the like.

In order to obtain a better appreciation of the advantages of this invention, it should be understood at the outset that in connection with valves useful for service on automatic washing machines, such as that described in patent application Serial #790,638, filed December 9, 1947, now Patent No. 2,548,516, dated April 10, 1951, it has frequently been objected that with the bellows normally employed to control the water temperatures within specific limitations, a greater torque is necessary to operate and therefore a structurally stronger electro-magnet is required to disengage the actuating pawl than that heretofore required during the course of valve operation. Accordingly it is an important object to overcome the foregoing objection by providing a valve which is more easily operable, accessible for adjustment, repair or replacement.

More particularly, it should be understood that the valve with which this invention is associated is used on an assembly wherein the spring is compressed to a predetermined length to obtain desired resistance to the bellows so that the regulating closure member of the valve will be properly acted upon.

As evidenced from the patent application identified by the serial number referred to above, it is the normal procedure that hot and cold water pass through the respective inlets of the valve as hereinafter described, and also in the usual practice the adjustment control of this invention is set to obtain 90 degrees Fahrenheit mixed water.

As will hereinafter become more readily apparent, in the preferred form of our invention the ratchet employed is designed to provide several notches in order to obtain a predetermined temperature setting for each notch, which advantage is lacking in the prior art.

It is therefore an important object to provide a construction whereby the turning of the temperature control stem in a clockwise direction and holding it with either a pawl or trigger the desired gap between regulating closure member and the bellows is maintained, which thus permits the bellows to expand and thereby enable a higher temperature to be attained before actuating the regulating closure member. As will hereinafter become more readily apparent, to return the adjustment control stem to its original setting of 90 degrees F., the pawl will be disengaged by some independent source, as for example, by an electro-magnet. The resilient element, such as a spring, then forces the bellows against the regulating closure member thereby shutting off the hot water supply, admitting cold water and allowing the bellows to contract and the adjusting stem to return to the 90 degrees F. position.

It is therefore another important object of this invention to provide a structure which enables an operator or a user of an automatic washing machine or the like to select one of the various wash temperatures and then to afterward automatically secure a lower predetermined rinse water temperature when desired. This combined advantage is a feature clearly missing in previous constructions.

Other equally important objects and advantages of this invention will become more readily apparent upon proceeding with the following specification read in light of the accompanying drawings in which Fig. 1 is a fragmentary sectional assembly view of a valve embodying our novel temperature control.

Fig. 2 is a sectional view taken on the line 2—2 of Fig. 1.

Fig. 3 is a fragmentary sectional view of the valve in side elevation.

Similar reference characters refer to similar parts throughout the several views.

Referring now to Fig. 1, an automatic washing machine valve is shown of the general type referred to in the patent application serial number above identified. It comprises the usual body or casing 1 in which the lower housing 2 has the respective hot and cold water inlets 3 and 4. The latter housing is attached to the casing 1 by means of the screws 5 and is held in sealed relation therewith by means of the gasket 6. The casing is connected by the usual inner passages communicating with the respective hot and cold water inlets and is provided with a central chamber 7 having a main valve closure member therewithin (not shown) and a thermostatic element 8 which is of the type shown in patent application Serial #212, filed January 2, 1948, now abandoned. Since these patent applications described fully the details of the respective valve and thermostatic element constructions, it is deemed unnecessary to refer to them here in any other but a general manner.

In the same way as described in connection with patent application Serial #790,638 the thermostatic element 8 contracts or expands in response to the entry of hot and cold water within the chamber 7. It has been found by actual tests on the valve that the latter bellows has a movement of five thousandths of an inch per each degree of temperature change.

As for the discharge from the side chamber 9, this is provided for by having therewithin a valve not shown which is actuated by means of the solenoid 11 in the same manner as described in connection with the valve patent application above referred to. The construction described thus far is not new insofar as this contribution is concerned but has been described merely because it embodies the novel temperature control mechanism which forms the basis of the instant invention.

Assuming that it becomes necessary or desirable to control the amount of expansible movement of the thermostatic element 8, the gasket sealing element 12 having the depending corrugated tubular portion 13 makes a fluid seal connection at the lower end of the adjusting stem 14 by means of the flat gasket 15. The adjusting stem 14 and the lower portion of the bellows 13 are reciprocally movable and depend upon the degree of axial movement established in the responses of the thermal element 8 to temperature changes. As indicated, the upper portion of the casing 1, the base 16 of the housing 17 is held in leak-proof relation to the casing 1 by means of the gasket 12, the housing being apertured as at 18 to permit the projection of the adjusting stem 14 therethrough. The adjusting stem 14 is provided with the integral adjusting nut 14a and the lock nut 19 whereby the coupling cup 21, mounted threadedly on the adjusting stem may be suitably positioned axially relative to the adjusting stem depending upon the amount of thread engagement at 22. Superposed above the cup member 21 and mounted upon the main stem 20 is the nut 23 threadedly engageable by the quick running threads of the said stem. Supported upon the nut 23 is the overrun spring 37.

At the upper end of the housing 17, the pawl bracket 24 is mounted, being suitably held to the housing by means of the rivets 25, the form of the bracket being shown more clearly in Fig. 2. The bracket member 24 serves as a vertical support for the pawl 26, pivotally mounted on the shaft 27 and being locked in position by means of the washer 28. The end 29 of the pawl 26 engages suitable notches 31 in the ratchet 32, the ratchet being held non-rotatably on the stem 20 by means of the set-screw 33 so as to hold the ratchet in such described position. The opposite integral end portion 34 of the pawl or trigger member 26 is suitably actuated as hereinafter described by means of the electro-magnet 35.

After a predetermined initial setting for a washing operation, the electro-magnet 35 is electrically energized by means of the line connections made at the terminals 40, the end portions 34 being drawn toward the electro-magnet. Contact is made at 36 and thus disengages the opposite end of the pawl member 26 from the notch 31 of the ratchet 32 thereby allowing the stem under the influence of the spring 37 to reverse itself causing the ratchet 32 to be rotated and causing the stem 20 to be similarly rotated in the same direction upon the quick threads of the stem as illustrated. Because of the quick threads employed on the stem 20, the spring 37 can easily rotate the stem as described. This rotation causes the adjusting stem 14 to move downward, thereby permitting the thermal element 8 to return to its original setting.

At this stage of operation all hot water is shut off and the thermal element is returned to its original setting of 90 degrees F. mixed water or whatever previous setting was required in the washing cycle. The return temperature setting is controlled by means of the handwheel 38 non-rotatably mounted by means of the square 39 upon the stem 30. For the resilient mounting of the pawl, the coiled spring 41 holds the pawl 26 suitably in engagement with the notches 31 of the ratchet 32, the spring having the integral vertical extension 42. Thus a convenient and simple actuating control of the temperature of the water as it passes through the valve and machine is obtained.

The rotation of the ratchet 32 is predeterminedly limited or stopped in the usual manner by means of the ratchet pin 44 and the stop 45 on the housing 17.

The detailed description of operation of the foregoing temperature control mechanism of valve for automatic washing machine follows.

The main valve is assembled with the spring 37 compressed to a predetermined length in order to obtain sufficient loading so that the regulating closure member (not shown) will be actuated by temperature to control the desired volume or mixture of hot and cold water entering the respective inlets 3 and 4. The rotatable ratchet 32 is selectively positioned so that the first notch is engaged by the pawl 34, and locked securely in that position by means of headless set-screw 33. Assume that the valve as thus assembled is to be set for approximately 90 degrees F. temperature of mix. Hot and cold water are then passed through respective inlets 3 and 4 and the valve is set for desired 90 degrees F. mixed water by means of the adjusting stem 14. It is locked in the latter position by means of the locknut 19.

To obtain a higher mixed temperature the temperature control or main stem 30 is turned clockwise by means of handwheel 38 to the desired notch where it is held by means of pawl 34 and the coiled pawl spring 41 with its extension 42. The turning of the temperature control stem 30 clockwise creates a gap between the bellows 8 and regulating closure member (not shown) thereby permitting the bellows 8 to attain a higher temperature before actuating the regulating closure member. To return the adjustment control stem 19 to the original setting of 90 degrees F., the pawl 34 is disengaged by energizing the electro-magnet 35 and the spring 37 then forces the bellows 8 downward shutting off the hot water and supply and admitting cold water alone and thereby allowing the bellows to contract until the original setting of 90 degrees F. mixed water is again obtained.

Obviously the notches 31 on the ratchet can be spaced to obtain any desired gradation of mixed temperatures.

By means of the usual controls described in the patent application referred to, the water passes through the casing portion 9 and then out through the outlet 43, as shown more clearly in Fig. 2. Because of the arrangement hereinabove described, it should be obvious that without any further act on the part of the user the danger of continuing with hot water is eliminated, which is important for example in connection with the washing of woolens whereby shrinking occurs, and this also applies to other relative delicate and expansive fabrics. When the manual setting is made so as to allow for the rotation of the ratchet 32, it becomes necessary to again reset the ratchet manually before the cycle as above referred to can be obtained, and eliminates any danger of forgetfulness on the part of the user. Briefly the use of the electro-magnet requires a new manual resetting.

Obviously, numerous changes may be made in the embodiments shown and described. Accordingly the spirit of the invention should be interpreted in light of the appended claims.

We claim:

1. The combination in a thermal adjustment mechanism, a housing, an axially expandible thermostatic element, an adjusting stem movable with the said thermostatic element, a main stem movable with the said adjusting stem, a threaded nut movable axially relative to the main stem, a ratchet fixed to the said main stem, resilient means interposed between the nut of the said main stem and said housing to actuate the said ratchet, a casing for the said thermostatic element, the said housing supporting said main stem, means engaging the said ratchet to restrain the latter against rotation, independently actuated means for releasing the said latter ratchet engaging means to permit said resilient means to actuate the said ratchet, means for rotating the said ratchet after the said ratchet has been actuated by the said independently actuated means, the said means for engaging the ratchet comprising a spring and a pawl resiliently mounted relative to said spring, the latter member normally holding said pawl in engagement with notches of the said ratchet, whereby predetermined rotation of the said main stem permits the thermostatic element to expand to certain limits by creation of a predetermined end gap.

2. In a combined thermostatic control and adjusting mechanism, a thermostatic element therefor, mounting means for the said thermostatic element including a housing, adjustable stem actuating means cooperating with the said thermostatic element having quick running threads, other actuating means co-extensive with the said first-named actuating means and having a journalled connection with the latter means by engagement with the said running threads, resilient means between the journalled connection of the second-named stem actuating means and the said housing, locking means comprising a ratchet for predeterminedly holding the said second-named actuating means against rotation, the said locking means being supported by the said housing, pivotal means normally engaging said locking means, the said locking means being fixed to the said second-named actuating means for selectively actuating the said locking means to cooperate with the said second-named actuating means to return the said locking means to its original setting after being moved by the said first-named stem actuating means.

3. In a temperature control and adjusting mechanism including a thermostatic element, an adjustable actuating member cooperating with said thermostatic element, cup form connecting means therebetween, a second actuating member comprising a main stem having a running thread engaging the said connecting means to join with the said first-named actuating member, a housing for support of the said thermostatic element, resilient means interposed between the said main stem and the said housing, the said housing supporting said second actuating member, a rotatable toothed locking member operatively engageable with the said second actuating member, resiliently mounted pivotal means engageable with the said locking member, electrically actuated means for predeterminedly releasing the said pivotal means, the said second actuating member having means for rotating the said locking member after the latter member has been actuated by the said electrically actuated means.

4. In a thermostatic adjusting mechanism of the character described, the combination comprising a thermostatic element, supporting means for the said thermostatic element, divided stem adjusting means comprising upper and lower portions cooperating with the said thermostatic element, one of the said divided stem portions having connecting running threads with the other portion, the other portion consisting of a stem having a nut for connection with the running threads of said first-named divided stem portion, resilient means supported by the said nut connection between the thermostatic element supporting means and the adjusting means, locking means including a pawl and ratchet for said adjusting means, the said locking means being fixed to the upper portion of the adjusting means, electrical means for actuating the said locking means at predetermined times, manual means cooperating with said upper portion of the adjusting means to move the said locking means to its original setting after actuation by the said electrical means.

5. Adjusting mechanism for a thermally actuated valve or the like, the combination comprising a thermostatic element within the valve responsive to changes in temperature therewithin, an adjusting stem to cooperate with the said thermostatic element, a main stem axially movable relative to an end of said adjusting stem and forming substantially a continuation thereof, a nut on the main stem, resilient means supported by the said nut, a ratchet fixed to the said main stem and supported by the latter member, the said ratchet being predeterminedly actuated by the said resilient means, a handle for actuating the said main stem, a pawl normally engaging the said ratchet, independent means to operate the pawl to cause the latter element to be withdrawn from engagement with the said ratchet upon actuation of said independent means, the said pawl being normally held in engagement with the said ratchet, the said main stem providing means for resetting the said thermostatic element whereby the rotation of the said main stem causes the adjusting stem to be moved downward thereby permitting the said thermal element to be returned to its original setting.

6. Adjusting mechanism for a thermally responsive valve or the like, the combination including an expansible thermostatic element within the valve responsive to changes in temperature, an adjusting stem axially cooperating with the said thermostatic element to regulate the response of the latter, a main stem connected to the said adjusting stem, a nut on the main stem, resilient means supported by the said nut, a ratchet fixed to the main stem and being non-rotatably mounted relative to the said latter stem, the said ratchet being actuated by the said resilient means, a handle for actuating the main stem, a pawl normally engaging the said ratchet, independent means for moving the pawl to withdraw the latter member from engagement with the ratchet upon actuation of the said independent means, the said pawl being normally held resiliently in engagement with the said ratchet, the said main stem providing for resetting the thermostatic element to its original position upon actuation of the main stem, the said ratchet when predeterminedly engaged by the pawl allowing for lag between the said thermal element and the adjusting stem.

7. In a thermal adjusting mechanism of the character described, the combination including a thermostatic element of the expandible-contractible type, a housing superposed above the said thermostatic element, an adjusting stem therefor, a main stem projecting from an upper portion of the said housing and cooperating with the said adjusting stem to regulate the axial movement of the latter in relation to the thermostatic element, a nut threadedly mounted on the main stem, resilient means interposed between a portion of the said housing and the said nut mounted on the said main stem, a bracket on the housing, a ratchet on the said bracket non-rotatably mounted relative to the said main stem, a spring member on the bracket, a pawl cooperating with said spring member to resiliently engage the said ratchet, electromagnetic means for predeterminedly releasing the said pawl from engagement with said ratchet, the said main stem having actuating means for thereupon rotating the said ratchet in cooperation with the said bracket spring member.

FRANCIS J. CANTALUPO.
EDMOND P. DE CRAENE.
RAYMOND P. SETKA.

REFERENCES CITED

The following references are of record in the file of this patent:

UNITED STATES PATENTS

| Number | Name | Date |
|---|---|---|
| 2,377,551 | Harvey | June 5, 1945 |
| 2,442,886 | Bowen | June 8, 1948 |
| 2,448,170 | Brown | Aug. 31, 1948 |